United States Patent Office 3,382,405
Patented May 7, 1968

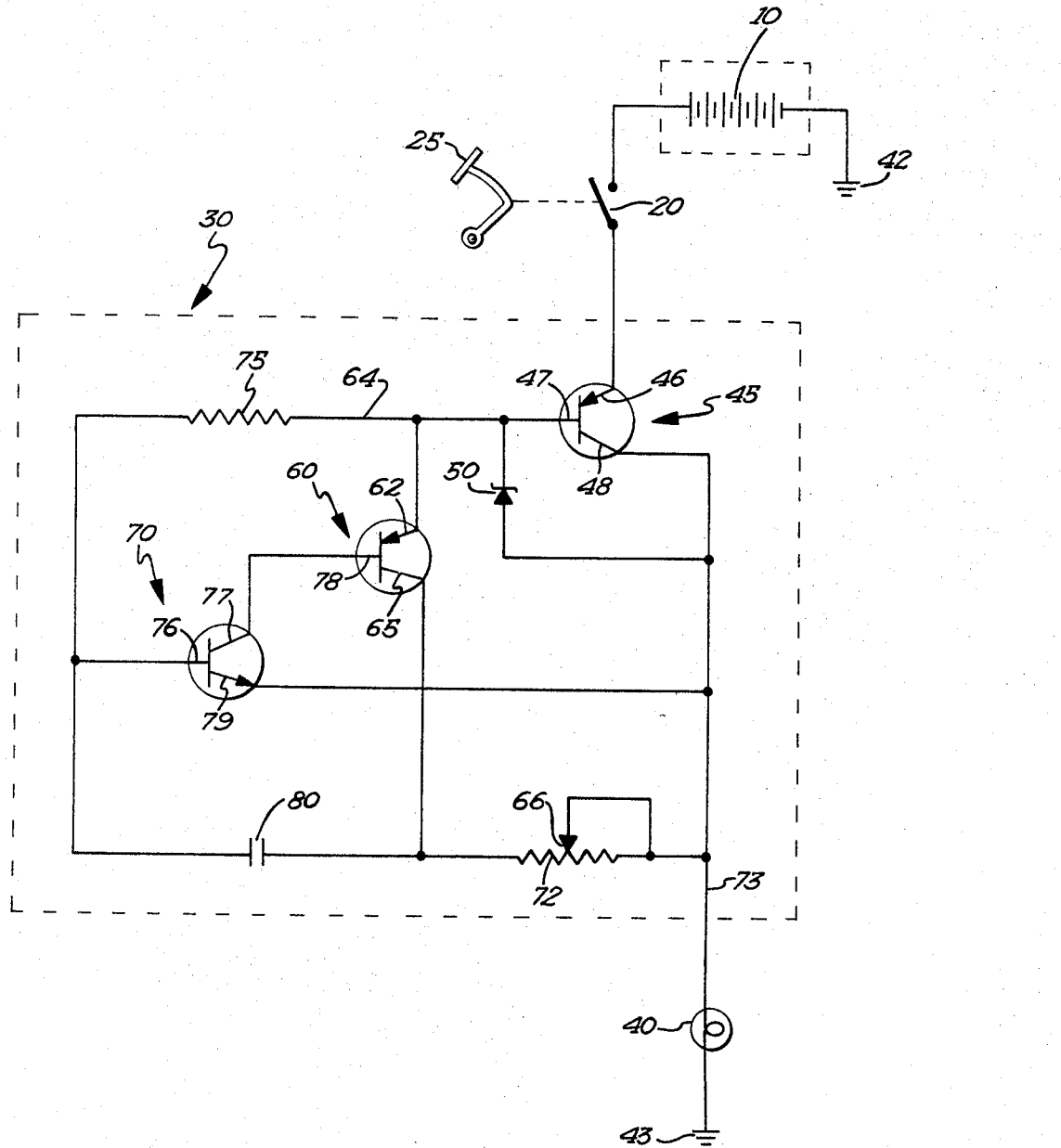

3,382,405
TRANSISTOR OSCILLATOR SYSTEM FOR FLASHING BRAKE LIGHTS
Howard S. Johnson, Minneapolis, Minn., assignor, by mesne assignments, to Safety Systems, Inc., Minneapolis, Minn., a corporation of Minnesota
Filed July 15, 1966, Ser. No. 565,607
8 Claims. (Cl. 315—80)

ABSTRACT OF THE DISCLOSURE

The invention is directed to a transistorized electronic switch mechanism connected in the brake stop-light circuit. The electronic switch mechanism also includes a Zener diode connected between the base and collector elements of the switching transistor or power transistor to maintain a voltage level at the base element thereof and thus limit the conduction of the switching transistor. Operating the switching transistor, is a transistorized oscillator which sets the frequency of the timing pulses applied to the switching transistor. The signal lamps are thus continually supplied with a pulsating signal voltage which is always above the low reference point of potential of the battery or power source, when the brake-actuated switch is closed. When the brake-actuated switch is open, power is removed from the electronic switch and oscillator and no current is drawn from the battery or power source.

---

My invention relates to a brake light circuit for vehicles and more particularly to an improved brake light circuit which will provide a high-speed blinking light output whenever the brake is applied on a vehicle to increase signal warning therefrom.

The conventional braking light circuit controlled by operation of the brake pedal of a vehicle through a switch associated therewith to establish a fixed level of light intensity at the taillights of a vehicle has in many instances failed to produce adequate warning particularly with new style vehicles having a large assembly of lights on the rear of the vehicle. In addition, turn signals which are normally located in the same assembly with the taillights and stoplight often add to confusion as to whether brakes are being applied or a turn is indicated. It has been found that a pulsating light will do more to attract attention and be more conspicuous to an observer following a vehicle at night if the rate of oscillation is high. The present invention is directed to an improved brake light circuit in which the normal brake light has imparted thereto a high degree of oscillation or pulsation from extremely bright to a dim condition without being completely extinguished to attract attention and provide an improved warning system that brakes are being applied on the vehicle in which it is used. The rate of oscillation will be considerably higher than that of a turn signal so that it may be readily distinguished therefrom and also from the fact that it will be applied to the dual taillights of a vehicle. This improved apparatus eliminates a mechanical switching for extreme long life and positive operation together with high-speed oscillation. Further the improved apparatus will be operated in a safe condition to provide a normal brake warning system and will be applied and controlled from under the primary control of the brake pedal in the event of most types of failures. This improved brake light circuit includes an electronic switching means readily connected into the brake control circuit and incorporates an electronic pulsing or timing control which is adjustable for varying degrees of pulsed operation to give an apparatus which is reliable, economical and fail safe in operation. Further it may be readily installed by inserting or connecting the same in the brake control circuit with a simple two wire connection and will be energized or operative only whenever the brake pedal is operated.

Therefore it is the principal object of this invention to provide an improved brake light circuit.

Another object of this invention is to provide in an improved brake light circuit an electronic switching circuit and control containing no movable parts which will provide a high-speed pulsed light output from the brake light.

A still further object of this invention is to provide a simplified brake light circuit which may be readily installed with only two connections thereto in the brake light circuit, does not draw any power when not in use and has a long life.

A still further object of this invention is to provide an improved brake light circuit in which failure in the brake light circuit will always provide a brake indication under direct control of the brake pedal.

These and other objects of this invention will become apparent from a reading of the attached description together with the drawings wherein:

The drawing shows a schematic diagram of the improved brake light circuit.

As disclosed schematically in the drawing, the improved brake light circuit includes the battery power supply or power source, indicated generally at 10, and normally includes as a part of the vehicle, a switch 20 in series therewith and operated by means of a brake pedal, such as indicated schematically at 25. Included in this circuit is a pulsating control, indicated generally at 30, which effects a secondary control to provide the pulsating energization of the brake light or lights indicated generally at 40. This control circuit includes a ground connection 42 on the battery supply and a ground connection 43 on the light 40 to complete the circuit through the vehicle structure. In this improved brake light circuit, the pulsing control 30 is effective only when the brake pedal 25 is deflected to close the switch 20 associated therewith indicating a need for operation of the brake light and providing the primary energization or control for the light or lights 40 through the circuit described above. Pulsing or secondary control 30 is an electronic switch which is operative only when the switch 20 is closed and is energized only under these conditions to vary the control or energization or the voltage level supplied to the light 40 to vary the intensity of illumination from the same and to pulse the same at an adjusted frequency, preferably at a high rate, such that the light will be visible and attention getting to those viewing the light, particularly at night. The particular light or lights 40 will be energized between a maximum level of energization, somewhere between the highest voltage output of the battery minus circuit voltage drop and a low level of intensity at which the light will still be visible to the observer. By energizing the brake light 40 with the voltage pulsing at a high frequency rate between a high and low level, the light will attract attention at night to stand out as a clear and safe indication of brake application.

The pulsing control 30 includes a primary electronic switch or transistor 45 having emitter 46, base 47, and collector 48 electrodes, this transistor being of the PNP type. Connected in controlling relation between the base electrode 47 and the emitter electrode 48 in a grounded collector configuration, is a Zener diode 50 and a transistor oscillator, to be hereinafter described. The diode 50 is connected from the collector base electrode in such a manner that it adjusts a minimum voltage bias level on the base 47 of the transistor in accord with the back or reverse voltage of the diode to establish a minimum low intensity level for the conduction of the transistor 45 and a minimum light intensity level from the brake light 40. The transistor oscillator is comprised of a pair of transistors indicated at 60 and 70 respectively, the transistor 60 being a PNP type transistor and the transistor 70 being of an NPN type. The transistor 60 has emitter 62 connected to a conductor 64 common to the base electrode 47 of transistor 45 and with its collector 65 being connected to one end of a resistor 72 which adjusts the bias on the oscillator circuit, the other end of the resistor 72 being common to the collector electrode 48 and a conductor 73 providing an output terminal or conductor for the pulsing control 30 common with the lights 40. Also connected to the conductor 64 is a bias resistor 75 leading to a base electrode 76 of transistor 70 with the collector electrode 77 of this transistor being connected to the base electrode 78 of transistor 60. An emitter electrode 79 of transistor 70 is connected to the conductor 73 common to the collector of the primary switching transistor 45. The oscillator includes a capacitor 80 connected at one extremity to the base electrode 76 with the bias resistor 75 and at its other extremity to the conductor 66 common to the resistor 72 controlling the bias on the oscillator circuit.

While I have shown a transistor oscillator for the pulsing control, it will be understood that a variety of forms of oscillators and multivibrators may be employed for this purpose.

Whenever the brake pedal 25 is deflected closing the switch 20, the battery supply will be applied across the pulsing control or electronic control circuit 30 to the light bulb or brake light to energize the same. It will be noted that this circuit includes only two connections in the control circuit to simplify the installation of the same. Further the control circuit will be energized only at a time when the brake pedal is deflected operating the switch 20. With closure of the switch 20, battery power will be applied to the switching transistor 45 adjusting level of energization of the bulb 40 to a predetermined low level as determined by the back voltage of the Zener diode 50 connected between the base and collector electrodes of the transistor 45. With such energization, the control circuit for the oscillator will be energized and the capacitor 80 will be charged in accord with the values of the resistors 75 and 72. As the capacitor is charged, the bias level applied or adjusted by the resistors 75 and 72 will adjust the voltage on the base 76 of transistor 70 to cause the same to conduct, thus turning on the transistor 60 and decreasing the bias voltage or level at the base 47 of the switching transistor to cause the same to conduct at a higher intensity or level. As the capacitor 80 reaches a predetermined charge level, it will adjust the bias on the base of the transistor 70 to turn off the same, which will also cause the transistor 60 coupled thereto to turn off allowing the bias on the transistor 45 to return to a high level and reduce the conduction of the switching transistor 45 to decrease the intensity of the light 40 by decreasing the voltage applied across the same or increasing the drop across the switching transistor 45. As charging capacitor 80 discharges through the resistor 75, a level of energization will be reached on the base 76 which will again turn on the transistor 70 causing the transistor 6 to fire again and shift the bias on the switching transistor to cause the same to come to a full intensity. This switching control circuit may be varied in type but the presence of the Zener diode to control the low level of energization of the switching transistor to maintain a minimum intensity of light output at the brake lights is essential to the invention. The frequency rate of oscillation or pulsation of the switching transistor will be determined by the resistors 75 and 72. The frequency of oscillation of the pulsing circuit will be adjusted by adjusting the bias level of the base of the transistor 70 through the resistor 72.

In this manner, the frequency of pulsation will be determined and the rate of oscillation can be established at a high level to provide a pulsing light intensity which will be readily visible at the brake light to increase the response to such blinking lights by way of a safety feature.

In considering this invention it should be remembered that the present disclosure is intended to be illustrative only and the scope of the present invention should be determined by the appended claims.

What is claimed is:
1. A brake light circuit for a motor vehicle comprising in combination, a brake pedal operated switch, circuit means adapted to be connected to a battery supply source and including said brake operated switch, a brake light connected in said circuit means to be energized from said battery supply source and controlled by operation of the brake operated switch, a second switch means included in said circuit means in series circuit with the brake operated switch and adapted to control the energization of the brake light whenever the brake operated switch is operated to an on position, and electronic control means connected to and controlling the operation of the second switch means to operate said second switch means in the circuit means to continuously supply current from the battery supply source between two levels of energization in a pulsating manner.

2. The brake light circuit for a motor vehicle of claim 1 in which the electronic control means is an oscillator which controls the operation of the second switch means between two levels of conduction without placing said second switch means in a condition for nonconduction to maintain varying levels of energization of the brake light.

3. The brake light circuit for a motor vehicle of claim 2 in which the second switch means includes a transistor.

4. The brake light circuit for a motor vehicle of claim 2 and including a voltage level maintaining device connected in controlling relationship across the second switch means to limit minimum conduction of the same.

5. The brake light circuit for a motor vehicle of claim 4 in which the voltage level maintaining device is a Zener diode connected in parallel circuit with the oscillator and to the second switch means.

6. The brake light circuit for a motor vehicle of claim 3 in which the transistor is of the PNP type connected in a grounded collector circuit configuration in the circuit means.

7. The brake light circuit for a motor vehicle of claim 6 in which the transistor includes emitter, collector and base electrodes with the emitter and collector electrodes being connected to the circuit means and with the emitter electrode being connected common to the brake operated switch and the collector electrode being connected common to the brake light, and with the electronic control means including the Zener diode being connected between the collector and base electrodes.

8. The brake light circuit for a motor vehicle of claim 4 in which the second switch means includes three electrodes two of which are connected in the circuit means and in which the voltage level maintaining device and the oscillator are connected in parallel circuit between the third electrode and one of said two electrodes.

References Cited

UNITED STATES PATENTS

| | | | |
|---|---|---|---|
| 3,018,473 | 1/1962 | Rodgers | 340—331 |
| 3,022,467 | 21/1962 | Leeder | 331—111 X |
| 3,054,970 | 9/1962 | Lace | 331—111 X |
| 3,178,609 | 4/1965 | Skirvin | 315—206 |

JAMES W. LAWRENCE, *Primary Examiner.*

C. R. CAMPBELL, *Assistant Examiner.*